United States Patent Office.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

PROCESS OF DYEING BLACK.

SPECIFICATION forming part of Letters Patent No. 473,928, dated May 3, 1892.

Application filed November 22, 1890. Serial No. 372,360. (No specimens.)

*To all whom it may concern:*

Be it known that I, MEINHARD HOFFMANN, doctor of philosophy, a citizen of Prussia, and a resident of Mainkur, near Frankfort-on-the-Main, Germany, have invented certain new and useful Improvements in the Production of Fast Colors on the Fiber, of which the following is a specification.

The object of this invention is the production of new black azo coloring-matters. Usually such substances are put on the market in a finished state; but whereas the new compounds invented by me are almost insoluble in water it is necessary to carry out my process in the dye-house by combining on the fiber the different components, each of which is soluble in water. This method has already been used for the production of red and brown shades; but no means were hitherto known to obtain black shades by the same, which can now be arrived at by means of a substance which I have discovered and named "naphthaline violet," forming the subject of Patent No. 464,566, dated December 8, 1891.

Naphthaline violet is produced in the following manner: 36.2 kilograms of diamidonaphthaline beta disulphonate of sodium are dissolved in four hundred liters water. To this solution I add sixty kilograms hydrochloric acid and fourteen kilograms nitrate of soda. The insoluble yellow tetrazo compound separates immediately. It is filtered and introduced into a solution of thirty-six kilograms of alpha-naphthylamine chlorhydrate in one thousand liters water. Instead of this aqueous solution I may use a solution of twenty-nine kilograms of alpha-naphthylamine in six hundred liters alcohol. The formation of the coloring-matter can be accelerated by addition of a small quantity of carbonate or acetate of soda. The coloring-matter, which is difficultly soluble in cold water, is filtered off and dried.

Black colors are produced from naphthaline violet by the following reactions: The violet is diazotized and the tetrazo-disazo compound is combined with phenols or amines. For the above-mentioned reasons this chemical process is best carried out in the dye bath.

Example: One hundred kilograms of cotton or piece goods I boil during one hour in a bath containing five kilograms of this naphthaline violet, previously dissolved in hot water; eight kilograms sulphate of soda or eight kilograms common salt for each one thousand liters of water and some carbonate of soda or another alkaline salt. The cotton thus dyed a deep violet I wash and enter it into a second bath containing five kilograms muriatic acid in one thousand liters water. A solution of one kilogram of nitrite of soda is slowly added and care is taken to keep always a little excess of nitrous acid. The violet color changes into brown. If the color does not change any more, the cotton is taken out, washed, and put into a third bath, which is composed of one thousand liters water, two kilograms beta-naphthol, and six hundred grams caustic soda. This operation produces a deep fast black on the cotton fiber. In order to produce this black on wool, I dye the same with three to four per cent. of naphthaline violet in a neutral or weakly-acidulated bath by the above-described method.

The compound which is fixed on the fiber has the following chemical constitution:

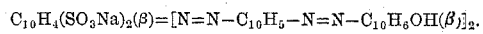

In the place of beta-naphthol in the third bath I may use the equivalent quantity of alpha-naphthol, dioxynaphthaline, resorcin, alpha-naphthylamine, meta-phenylenediamine, phenol, salicylic acid or naphtholmonosulphonic acid.

Having now described the nature of my said invention and in what manner the same is to be performed, what I claim, and desire to secure by Letters Patent, is—

The process of producing new black azo combinations on animal or vegetable fibers, which consists in first dyeing the material with the coloring-matter or substance named "naphthaline violet," herein described, then treating the dyed material with nitrous acid, and finally passing the same through a solution of a phenol or an amine.

In testimony that I claim the foregoing as my invention I have signed my name, in presence of two witnesses, this 11th day of November, 1890.

MEINHARD HOFFMANN.

Witnesses:
ALVESTO S. HOGUE,
JEAN GRUND.

It is hereby certified that Letters Patent No. 473,928, granted May 3, 1892, upon the application of Meinhard Hoffmann, of Mainkur, near Frankfort-on-the-Main, Germany, for an improvement in "Process of Dyeing Black," an error appears in the printed specification requiring the following correction, viz.: In line 30, the word "nitrate" should read *nitrite;* and that the said Letters Patent should be read with this correction therein that the same may conform to the record of the case in the Patent Office.

Signed, countersigned, and sealed this 2d day of August, A. D. 1892.

[SEAL.]

CYRUS BUSSEY,
*Assistant Secretary of the Interior.*

Countersigned:
N. L. FROTHINGHAM,
*Acting Commissioner of Patents.*